United States Patent [19]

Dykes

[11] 4,094,095
[45] June 13, 1978

[54] METHOD AND APPARATUS FOR USING ELECTRICAL CURRENT TO DESTROY WEEDS IN AND AROUND CROP ROWS

[75] Inventor: Willis G. Dykes, Vicksburg, Miss.

[73] Assignee: Lasco, Inc., Vicksburg, Miss.

[21] Appl. No.: 795,087

[22] Filed: May 9, 1977

[51] Int. Cl.² ............................................ A01M 21/00
[52] U.S. Cl. ..................................... 47/1.3; 126/271.1
[58] Field of Search ......................... 47/1.3; 126/271.1

[56] References Cited

U.S. PATENT DOCUMENTS

| 779,791 | 1/1905 | Lokuciejewsky | 47/1.3 |
|---|---|---|---|
| 2,484,443 | 10/1949 | Baker | 47/1.3 |
| 2,682,729 | 7/1954 | Poynor | 47/1.3 |
| 2,687,597 | 8/1954 | Rainey | 47/1.3 |
| 3,919,806 | 11/1975 | Pluenneke et al. | 47/1.3 |

*Primary Examiner*—Robert E. Bagwill
*Attorney, Agent, or Firm*—Cushman, Darby & Cushman

[57] ABSTRACT

A method and apparatus for destroying weeds growing in and around crop rows without destruction of crops growing therein. A plurality of electrically conductive spring members are disposed in a generally horizontal plane and connected to a high voltage source of electricity. The spring members have a spring constant such that relatively stiff crops plants will deflect the spring members while relatively flexible weeds will not deflect them. Substantially all of the plants in and around the crop rows are contacted with current-carrying portions of the spring members by moving the spring members relative to the crop rows parallel to the crop rows. A larger dwell time of contact is provided between the spring members and the relatively flexible weeds then the dwell time of contact between the spring members and the relatively stiff crop plant so that the weeds receive sufficient electrical energy to result in destruction thereof, while the crop plants do not receive sufficient electrical energy to result in destruction thereof. The difference in dwell time is provided by forming each spring member so that it has one end connected to a supporting member and the first portion extending from the connected end making a first angle $\alpha$ with a line along the direction of movement of the spring member, and having a free end with a second portion adjacent the free end making a second angle $\beta$ with a line along the direction of movement of the spring member, the angle $\beta$ being substantially greater than the angle $\alpha$, and by disposing the connected end of the spring member between crop rows while the free end extends into a crop row during movement of the spring member to affect contacting.

14 Claims, 5 Drawing Figures

METHOD AND APPARATUS FOR USING ELECTRICAL CURRENT TO DESTROY WEEDS IN AND AROUND CROP ROWS

BACKGROUND AND SUMMARY OF THE INVENTION

The invention relates to a method and apparatus for the destruction of weeds growing in and around crop rows without destruction of the crops growing therein. U.S. Pat. No. 3,919,806 discloses a method and apparatus that is suitable for the treatment of crop rows to kill weeds growing in and around the crop rows, said U.S. Pat. No. 3,919,806 disclosure taking advantage of height discrepancy between weeds and crop plants within the crop rows themselves, and providing a plurality of individually adjustable spring members extending between the crop rows for contacting of all plants within the crop rows. While the method and structure shown in U.S. Pat No. 3,919,806 are suitable for use with many crop plants, for some crop plants they do not achieve maximum weed destruction. In contradistinction to the method of U.S. Pat. No. 3,919,806 wherein contact of crop plants with current-carrying spring members was avoided, according to the present invention all plants — including crop plants — within and around the crop rows are contacted with current-carrying members, the spring members being so shaped and dimensioned according to the present invention so that the dwell time of contact between the spring members and relatively flexible weeds is greater than the dwell time of contact between the spring members and relatively stiff crop plants so that the weeds receive sufficient electrical energy to result in destruction thereof, while the crop plants do not receive sufficient electrical energy to result in destruction thereof.

According to the present invention the crop plants will generally receive significantly less electrical energy than the weeds, and when this is combined with the generally greater resistant of crop plants to destruction by electrical energy than weeds of generally the same height, the desired result of weeds destruction without crop plants destruction is achieved.

Other prior art proposals have suggested attempting to destroy only undesirable plants while leaving crop plants unharmed, as shown in U.S. Pat. No. 2,750,712, and 2,682,729. In both of these Patents the same assumption is made as according to the present invention — that is that the crop plants that will be growing will be stronger than the undesirable plant growth so that they will have a tendency to deflect a current-carrying member while the undesirable plant growths will not. In both of these patents, however, the structure was designed so that no current-carrying portion of the machine ever touched the crop plants but rather only plants that were bent by the current-carrying portions were touched with current. In order to provide such structures fairly complicated insulator members were provided associated with the current-carrying portions, and for the destruction of undesirable plants between crop rows mechanical means were provided rather than electrical means.

According to the present invention, it is believed that as good or better weed destruction will result than according to the inventions in U.S. Pat. Nos. 2,750,712 and 2,682,729, while much simpler apparatus is provided for effecting the destruction, electrical energy being used to destroy essentially all undesirable plants in and around the crop rows. According to the present invention an electrically conductive spring member is provided disposed in a generally horizontal plane and connected up to a high voltage source of electricity, the spring member having a spring constant such that relatively stiff crop plants will deflect the spring member while relatively flexible weeds will not deflect the spring member. No insulating structures need be provided around the spring member since the spring member will be brought into contact with substantially all the plants in the crop rows and surrounding area by moving the spring member relative to the crop rows parallel to the crop rows. Destruction of the weeds results while destruction of the crop plants does not — despite the fact that the both are touched by the current-carrying portions of the spring members — since a larger dwell time of contact between the spring members and the relatively flexible weeds is provided than the dwell time of contact between the spring members and the relatively stiff crop plants. This difference in dwell times of contact combined with the generally greater resistance of the crop plants to electrical energy destruction than the weeds, results in the destruction of one but not the other. The decrease in dwell time of contact with the crop plants as opposed to the weeds is accomplished by providing each spring member so that it has one end connected to supporting member with a first portion adjacent the connecting end making a first angle $\alpha$ with a line along the direction of movement of the spring member, and a free end connected to a second portion adjacent the free end, the second portion making a second angle $\beta$ with a line along the direction of movement of the spring member, the second angle $\beta$ being substantially greater than the first angle $\alpha'$, and by disposing the connected end of the spring member between crop rows while the free end extends into a crop row during movement of the spring to effect contacting. The angle $\alpha$ preferably is about 35° to 40°, while the angle $\beta$ is about 70° to 80°.

Preferably a plurality of spring members are provided operatively associated with a vehicle, a generally horizontally extending bar generally perpendicular to the direction of travel of the vehicle and supported by the vehicle being provided with the spring members mounted to the bar by means for mounting the spring members so that they are disposed in generally horizontal planes. Each mounting means supports two members, and the mounting means are spaced from each other a distance generally equal to the spacing between adjacent crop rows so that a mounting means is generally centered in each furrow between crop rows. The length of the first portion of the spring member making the angle $\alpha$ is significantly greater than the length of the second portion of the spring member making the angle $\beta$. Since the second portion is relatively short and since it makes a relatively great angle with respect to a line along the direction of movement of the vehicle, the crop plants will be touched only briefly before they deflect the spring member out of engagement therewith. On the other hand, the weeds between the rows will be contacted by the relatively long first portion of the spring member, and weeds both within the crop rows and around the crop rows will be deflected by the spring members so that they are bent and contact the spring members along the entire length thereof as the spring members move forwardly. Particular means are provided for adjustably mounting the spring members to the mounting means, and for adjusting the vertical position of the mounting means.

In some circumstances, where many weeds will be encountered that are significantly greater in height than the crop plants within the crop rows, it is also desirable to provide a conductive generally horizontally extending bar perpendicular to the direction of travel of the vehicle supported by the vehicle and located vertically above the spring members. The bar is operatively connected to a higher voltage source than the spring members since the plants which will be contacted thereby generally require a larger input of electrical energy to result in destruction thereof than the plants contacted by the spring members. The bar preferably is at a voltage of 15 to 30 kilovolts, while the spring members are at a approximately ⅓ the voltage of the bar, or at approximately 5 to 10 kilovolts.

It is a primary object of the present invention to provide a simplified method and apparatus for electrically destroying weeds growing in and around crop rows while not destroying the crop plants. This and other objects of the invention will become clear from an inspection of the detailed description of the invention, and from the appended claims.

DETAILED DESCRIPTION OF THE INVENTION

Figure 1:
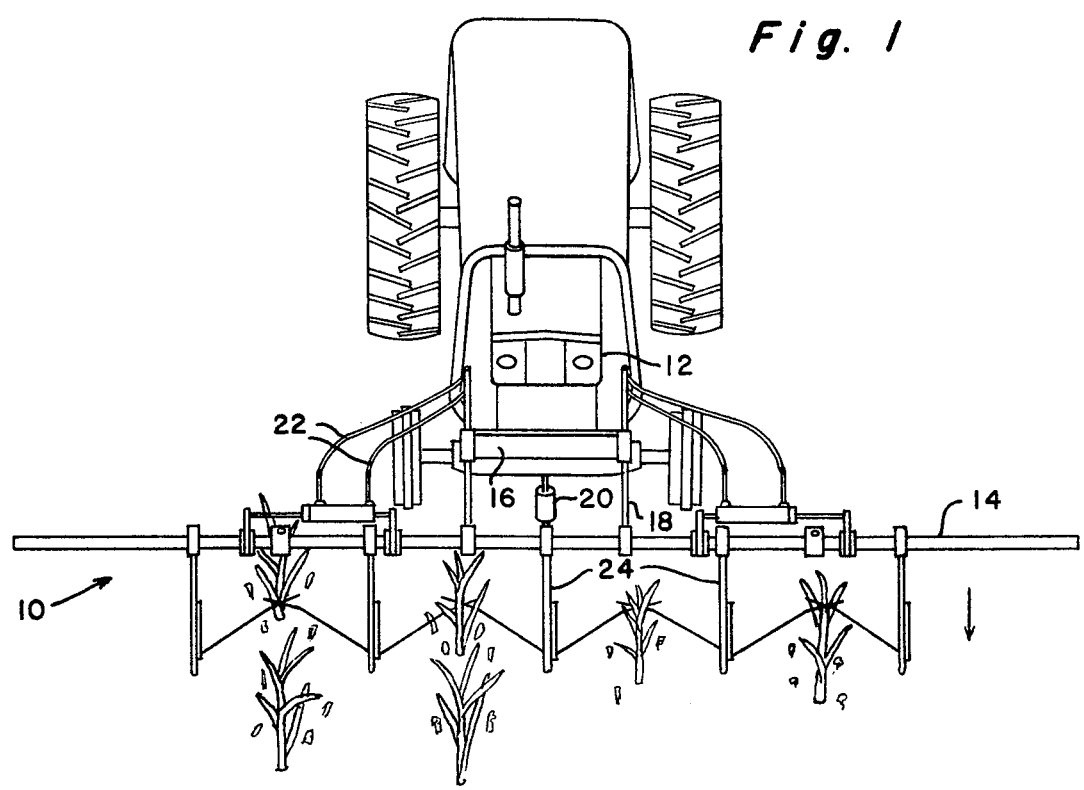
FIG. 1 is a front view of exemplary apparatus according to the present invention.

An exemplary machine according to the present invention is shown generally at 10 in FIG. 1. The machine includes a vehicle, such as a tractor 12, adapted to travel in a given direction D (see FIG. 3), with a source of high voltage electricity mounted on and movable with the vehicle 12 and means for connecting the high voltage source of electricity to ground, such as are conventional in the art and shown in U.S. Pat. No. 3,919,806 at 50 and 63 respectively. [A high voltage source 46 and a grounding wheel 47 are shown schematically in FIG. 5]. A generally horizontally extending bar 14 is mounted on the front of the tractor 12, generally perpendicular to the direction of movement D of the tractor 12. The structure for mounting the bar 14 includes structure for vertically moving the bar 14 including a pivotally mounted (about a horizontal axis parallel to bar 14) cross bar 16, a pair of attachments 18 for the cross bar 16 to the bar 14, and a hydraulic cylinder 20 or the like mounted to the vehicle 12 and the cross bar 16 for effecting pivotal movement of the cross bar 16 with respect to the vehicle 12. Power wires 22 extend from the high voltage source to the plant engaging conductive spring members 26, and the bar 14 is made of either conductive or non-conductive material, the wires extending for at least a portion of their length within the bar 14 to the means 26.

Means 24 are provided for mounting each conductive spring member so that it is disposed in a generally horizontal plane, one or more conductive spring members 26 being provided. The means 24 preferably include a generally downwardly extending member 25 rotatably mounted by connection 27 to the bar 14 at a first end thereof, and having curved portion 28 at the second end thereof, the portion 28 for engaging the ground and spacing conductive members 26 with respect to the ground. As the bar 14 is raised and lowered, the member 25 pivots about the connection 27, the end 28 at all times engaging the ground. Preferably each member 25 supports two spring members 26, one disposed generally on either side thereof, and a plurality of mounting means 24 are provided spaced from each other a distance generally equal to the spacing between adjacent crop rows (see FIG. 1).

Means 30 are provided for adjusting the height of the spring members 26 with respect to the member 25, the means 30 preferably comprising a saddle 32 which is generally triangular in shape, a pin 34 adapted to pass through an opening in the saddle and through corresponding opening 36 in the member 25 to hold the saddle 32 in place with respect to the member 25. To effect adjustment, the pin 34 is removed and the saddle 32 is slid along the length of the member 25 until the opening therein for receiving pin 34 is aligned with an opening 36 in the member 25, at which time time the pin 34 is reinserted to hold the saddle to the member 25. A support rod 38 extends downwardly from the saddle 32 — the saddle 32 always being disposed at an intermediate portion along the member 25 — and the spring members 26 are directly connected to the support rod 38. Electricity is provided to the members 26 by the wire 22 which first passes through an interior portion of the bar 14, through the end of the member 25 adjacent connection 27, interiorly of the member 25, looped around rollers or pins 40, and down to the members 26 through rod 38. The rollers or pins 40 are provided so that a sufficient length of the wire 22 will be provided within the member 25 so that the saddle 32 may be adjusted to any adjustment position thereof.

Figure 3:
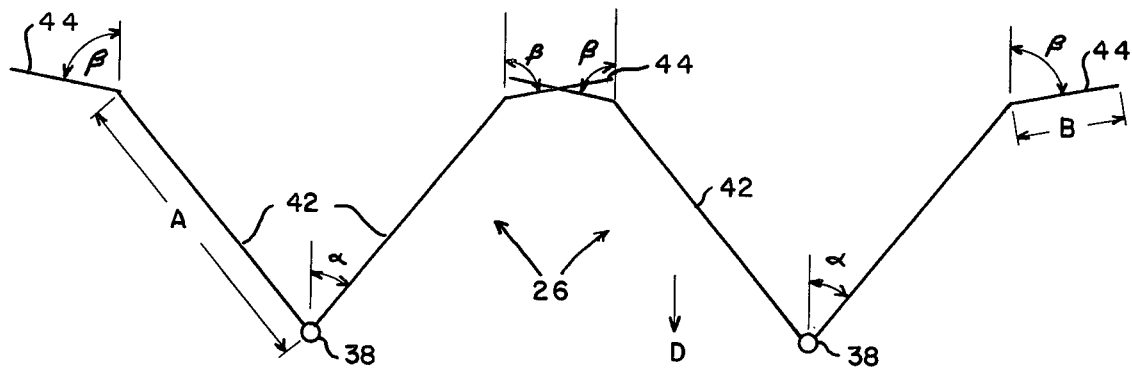
FIG. 3 is a top diagramatic view of exemplary spring members according to the present invention and the geometrical configurations thereof.

Means are provided for effecting a larger dwell time of contact between the spring members 26 and relatively flexible weeds than the dwell time of contact between the spring members 26 and relatively stiff crop plants, so that weeds contacted by the spring members generally will receive a greater amount of electrical energy than the crop plants. Such means comprise the particular construction of the spring members 26, and the relative positioning of the spring members 26 with respect to crops. Each spring member 26 comprises a first portion 42 having an end connected to the mounting means (support rod 38) and making a first angle $\alpha$ with respect to a line L—L along the direction of travel (D) of the vehicle 12, and a second portion 44 having a free end, the second portion making a second angle $\beta$ with respect to a line L'—L' parallel to the line L—L. The angle $\beta$ is substantially greater than the angle $\alpha$; for instance, $\alpha$ may be equal to 35° to 45° while the angle $\beta$ is about 70° to 80°. Should the portion 44 contact a crop plant, because the angle $\beta$ thereof is relatively large the dwell time of contact with the plant will be less than if the portion 44 were disposed at a lesser angle — such as $\alpha$ — since it will take less time for the portion 44 to deflect out of the way of the crop plant during movement of the vehicle in direction D. Also, the portion 42 of each member 26 has a length A which is substantially greater than the length B of its corresponding portion 44. The spring constant of each member 26 is selected so that relatively stiff crop plants will deflect the spring member 26 while relatively flexible weeds will not deflect the spring member. The mounting means 24 (38) for the spring members — to which the first portions 42 are connected — are disposed between the rows of crops as the vehicle travels in direction D, as can be seen from an inspection of FIG. 1. Thus, it will be seen that when the structure of FIG. 3 is utilized, weeds contacted by the portions 42 of the spring members 26 will be deflected, and the dwell time of contact between the portion 42 and each weed will be equal to the length of the weed stem from the initial point of contact to the top most portion of the stem divided by the forward ground speed. Weeds contacted by the portion 44 of a spring member 26 will essentially have the same dwell time of contact. On the other hand, crop plants — which will only be touched by the portion 44 since the portion 44 is the only portion of a spring member 26 which extends into the crop rows — will be deflected out of the path of the crop plants, the portion 44 being in contact with the crop plants only a short period of time since the large angle β at which the portion 44 is disposed results in relatively rapid deflection of the spring member 26 out of engagement with the crop plants rather than gradual contact of the crop plants over an extended portion of the spring member 26.

As shown in FIG. 3, the portions 44 of adjacent spring members sets 26 may be overlapped — alternately they could be arranged so that they were end-to-end or approximately end-to-end.

Figure 2:
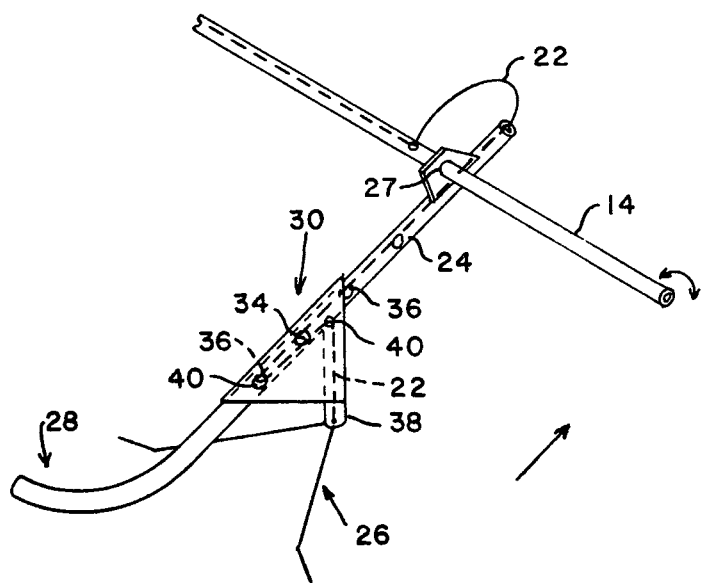
FIG. 2 is a perspective detail view of exemplary mounting means and spring members according to the present invention.

It will be seen that utilizing the structure of FIGS. 1 through 3 a method of destroying weeds growing in and around crop rows without destruction of the crops growing therein may be practiced, the method comprising the steps of: providing an electrically conductive spring member (26) disposed in a generally horizontal plane and connected up to a high voltage source (46) of electricity, the spring member having a spring constant such that relatively stiff crop plants will deflect the spring member while relatively flexible weeds will not deflect the spring member; contacting substantially all the plants in the crop rows and surrounding area with current-carrying portions of the spring member by moving the spring member relative to the crop rows parallel to the crop rows; and providing a larger dwell time of contact between the spring member and the relatively flexible weeds than the dwell time of contact between the spring member and the relatively stiff crop plants, so that the weeds receive sufficient electrical energy to result in destruction thereof while the crop plants do not receive sufficient electrical energy to result in destruction thereof. The step of providing a larger dwell time of contact with the weeds than the crop plants is accomplished by; providing a spring member so that it has one end connected to a supporting member, a first portion (42) adjacent the connected end making a first angle α with a line (L—L) along the direction of movement of the spring member to effect contacting, and a second portion (44) adjacent the free end making a second angle β with a line (L—L) along the direction of movement of the spring member to effect contacting, the second angle β being substantially greater than the first angle α; and disposing the connected end of the spring member between crop rows while the free end extends into a crop row during movement of the spring member to effect contacting. See FIG. 3 which illustrates the spring member 26, first portion 42, and second portion 44, with the supporting member 38 disposed between crop rows.

Figure 4:
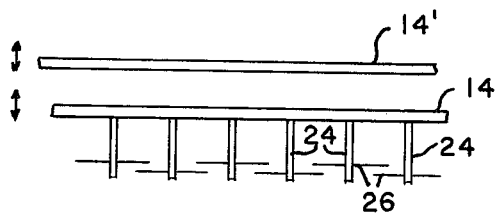
FIG. 4 is a diagramatic view of a further embodiment according to the present invention.
Figure 5:
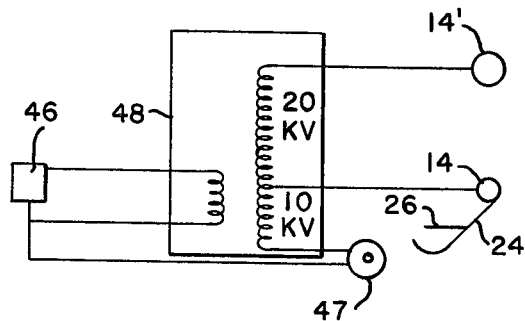
FIG. 5 is a diagramatic showing of an exemplary power hook up for the embodiment of FIG. 4.

In situations where a large number of fairly sturdy weeds are growing directly in the crop rows, extending above the crop plants, the embodiment diagramatically illustrated in FIG. 4 may be utilized. This embodiment is the same as the FIG. 1 embodiment except that a second horizontally extending bar 14' is provided, the bar 14' generally perpendicular to the direction of travel of the vehicle (parallel to bar 14) and supported by the vehicle 12, and vertically movable with respect to the vehicle 12. The bar 14' is conductive and any weeds contacted thereby will be destroyed. A suitable electrical hook up for the FIG. 4 embodiment is shown in FIG. 5. A high voltage source 46 of electricity is provided, and a wheel 47 (see analogous element 63 in FIG. 2 of U.S. Pat. No. 3,919,806) provides a ground connection for the high voltage source 46. A transformer 48 is provided, the transformer having two voltage takeoffs, the first voltage takeoff being the spring members 26, and the second voltage takeoff — which is higher than the first voltage takeoff — being for the second bar 14'. Since plants that are large enough to be contacted by the second bar 14' generally will require more electrical energy to effect destruction thereof, the voltage takeoff for the bar 14' preferably is significantly higher than the voltage takeoff for the spring members 26; also it is desirable to minimize the voltage of the members 26 so as to minimize the chances of destruction of the crop plants by contact therewith. Suitable practical exemplary values for the lower and higher voltage takeoffs are 5 to 10 kv and 15 to 30 kv respectively, the higher voltage takeoff being approximately three times as great as the lower voltage takeoff.

Alternatively, the bar 14 may be made conductive and the bar 14' eliminated. In such a case the wires 22 would be electrically isolated from the bar 14. The bar 14 would be connected up to the high-voltage takeoff in FIG. 5 (30 kv), while the lines 22 leading to the spring members 26 would be connected up to the low-voltage takeoff in FIG. 5 (10 kv).

Preferably the grounding disc 47 is isolated from the tractor 14 frame so as to isolate the high voltage from the frame. This may be accomplished by providing a yoke for the grounding disc 47 that has a relatively wide spread, the yoke being formed from a suitable high dialectric, high-strength material such as a laminated phenolic plastic.

It will be seen that according to the present invention a method and apparatus have been provided which recognize that the extent of internal damage produced in plants upon exposure thereof to high voltage electricity is a function of the amount of energy dissipated within the plant system, and that given constant electrical potential the amount of energy delivered to a plant is a function of the duration of contact with the plant; recognizing this fact according to the present invention a simple structure and method can be provided for contacting essentially all plants in and around crop rows to affect a destruction of the weeds while not effecting destruction of the crop plants since the duration of contact with the crop plants is generally less than the duration of contact with the weeds.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of destroying weeds growing in and around crop rows without destruction of crops growing therein, said method comprising the steps of:
   (a) providing electrically conductive spring members disposed in generally horizontal planes, each having a free end and a fixed end, and connected up to a high-voltage source of electricity, and each spring member having a spring constant such that relatively stiff crop plants will deflect said spring member while relatively flexible weeds will not deflect said spring member;
   (b) contacting substantially all the plants in said crop rows and surrounding area with current-carrying portions of said spring member by moving said spring member relative to said crop rows parallel to said crop rows, and disposing said connected end of each said spring member between crop rows while said free end extends into a crop row during movement of said spring member to effect contacting; and
   (c) providing a larger dwell time of contact between said spring members and said relatively flexible weeds than the dwell time of contact between said spring members and said relatively stiff crop plants, so that said weeds receive sufficient electrical energy to result in destruction thereof while said crop plants do not receive sufficient electrical energy to result in destruction thereof.

2. A method as recited in claim 1 wherein said step of providing a larger dwell time of contact with said weeds than with said crop plants is accomplished by providing each said spring member so that the fixed end is connected to a supporting member and the free end is remote from the fixed end, and a first portion adjacent said fixed end makes first angle $\alpha$ with a line along the direction of movement of said spring members to effect contacting, and a second portion adjacent said free end makes a second angle $\beta$ with a line along the direction of movement of said spring members to effect contacting, said second angle $\beta$ being substantially greater than said first angle $\alpha$.

3. A method as recited in claim 2 wherein said step of providing said spring members is accomplished by providing said first angle $\alpha$ about 35°–45°, and by providing said second angle $\beta$ about 70°–80°.

4. A machine for destroying weeds growing in and around crop rows without destruction of crops growing therein, comprising;
   (a) a vehicle adapted to travel in a given direction,
   (b) a source of high-voltage electricity mounted on and movable with said vehicle,
   (c) means for connecting said high-voltage source of electricity to ground,
   (d) a plurality of conductive spring members,
   (e) means for mounting said conductive spring members so that they are disposed in generally horizontal planes, and
   (f) means for providing a larger dwell time of contact between said spring members and relatively flexible weeds than the dwell time of contact between said spring members and relatively stiff crop plants, so that weeds contacted by said spring members generally receive sufficient electrical energy to result in destruction thereof while crop plants do not receive sufficient electrical energy to result in destruction thereof, said means comprising a first portion of each spring member having an end connected to said mounting means and making a first angle $\alpha$ with respect to a line along said direction of travel of said vehicle, and a second portion of each spring member having a free end and making a second angle $\ominus$ with respect to a line along said direction of travel of said vehicle, said second angle $\beta$ being substantially greater than said angle $\alpha$, and said connected end adapted to be disposed between rows of crops as said vehicle travels in said given direction; and wherein the length of said first portion of each spring member is significantly greater than the length of said second portion of each spring member; and wherein each spring member has a spring constant such that relatively stiff crop plants will deflect said spring member while relatively flexible weeds will not deflect said spring member.

5. A machine as recited in claim 4 wherein said angle $\alpha$ = about 35°–45°, and wherein said angle $\beta$ = about 70°–80°.

6. A machine as recited in claim 4 wherein a plurality of said spring members are provided, and each mounting means supporting two spring members, one disposed on either side thereof, and said mounting means being spaced from each other a distance generally equal to the spacing between adjacent crop rows.

7. A machine as recited in claim 6 further comprising a horizontally extending bar, generally perpendicular to the direction of travel of said vehicle, supported by said vehicle and vertically moveable with respect to said vehicle, said plurality of mounting means being mounted to said bar.

8. A machine as recited in claim 7 wherein each of said mounting means comprises a generally downwardly extending member rotatably mounted to said bar at a first end thereof, and having a curved portion at the second end thereof for engaging the ground, and a support rod extending downwardly from an intermediate portion of said member and mounting a pair of spring members.

9. A machine as recited in claim 8 further comprising means for adjusting the vertical position of said spring members with respect to said generally downwardly extending member, said means comprising a saddle adjustably mounted to said member and affixed to said support rod, and wherein a current carrying wire extends from said high-voltage source, source, through said downwardly extending member, and looped within said member and said saddle so that sufficient wire length will be provided even upon adjustment of the position of said saddle.

10. A machine as recited in claim 7 wherein said bar comprises a first bar, and further comprising a second generally horizontally extending bar generally perpendicular to the direction of travel of said vehicle, supported by said vehicle and vertically movable with respect to said vehicle, said second bar being located vertically above said first bar.

11. A machine as recited in claim 10 wherein a pair of voltage takeoffs are provided from said high-voltage source of electrical energy, one of said voltage takeoffs being at a higher voltage than the other of said voltage takeoffs, and wherein said second bar is operatively connected to the higher of said voltage takeoffs and wherein said spring members are operatively connected to the lower of said voltage takeoffs.

12. A machine as recited in claim 11 wherein the higher of said voltage takeoffs is at approximately 15–30 kv, and wherein the lower of said voltage takeoffs is at approximately 5–10 kv.

13. A machine as recited in claim 7 wherein said horizontally extending bar is conductive and is operatively connected to said high-voltage source of electricity, and wherein said bar is connected to a voltage significantly greater than the voltage to which said spring members are connected.

14. A machine as recited in claim 4 wherein said means for connecting said high-voltage source of electricity to ground comprises a grounding disc, and wherein means are provided for electrically isolating the grounding disc from the vehicle.

* * * * *